May 5, 1925.
F. W. LOVEJOY
1,536,347
APPARATUS FOR TAKING AND PROJECTING MOTION PICTURES
Filed Dec. 26, 1922    2 Sheets-Sheet 1
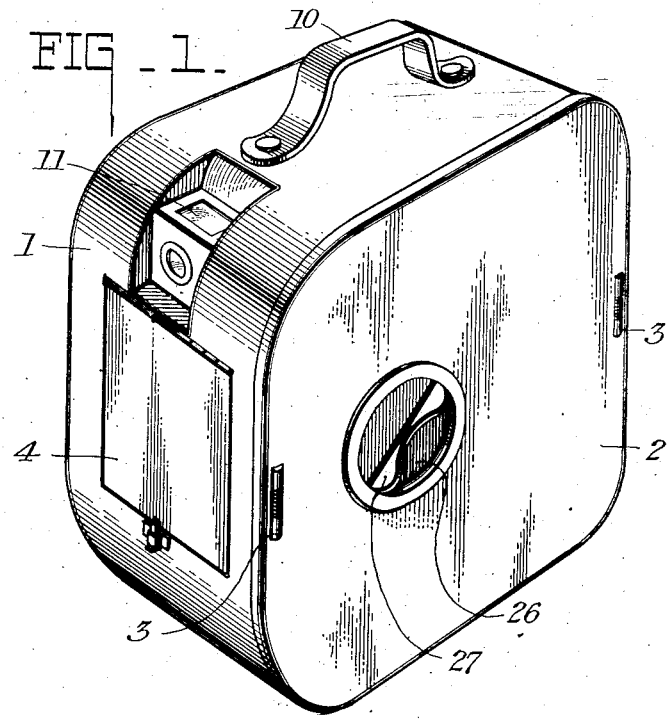
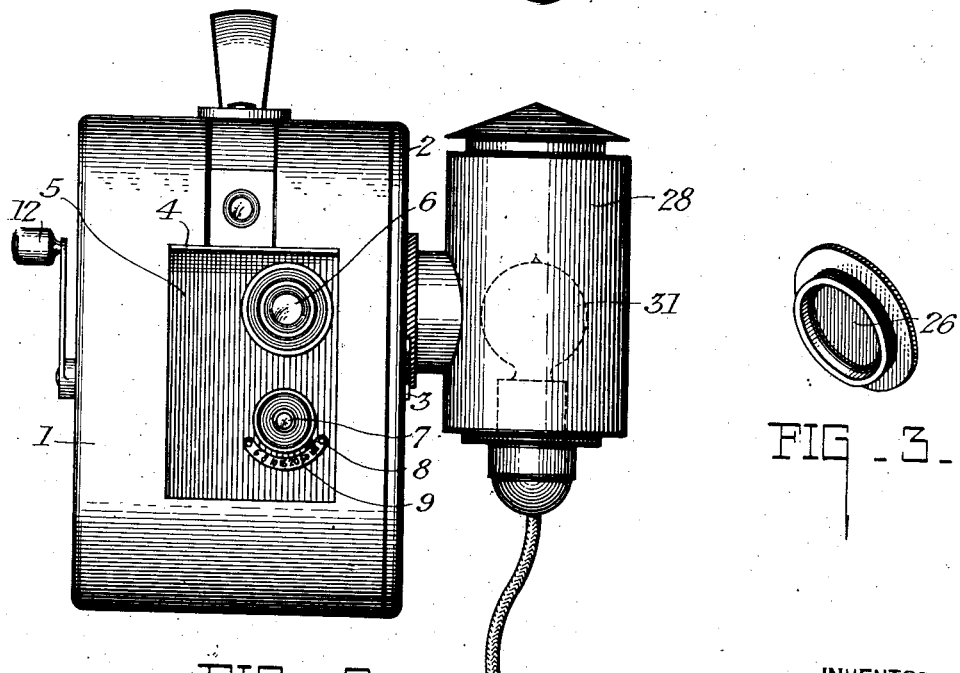
INVENTOR
Frank W. Lovejoy,
BY
ATTORNEY May 5, 1925.
F. W. LOVEJOY
1,536,347
APPARATUS FOR TAKING AND PROJECTING MOTION PICTURES
Filed Dec. 26, 1922
2 Sheets-Sheet 2
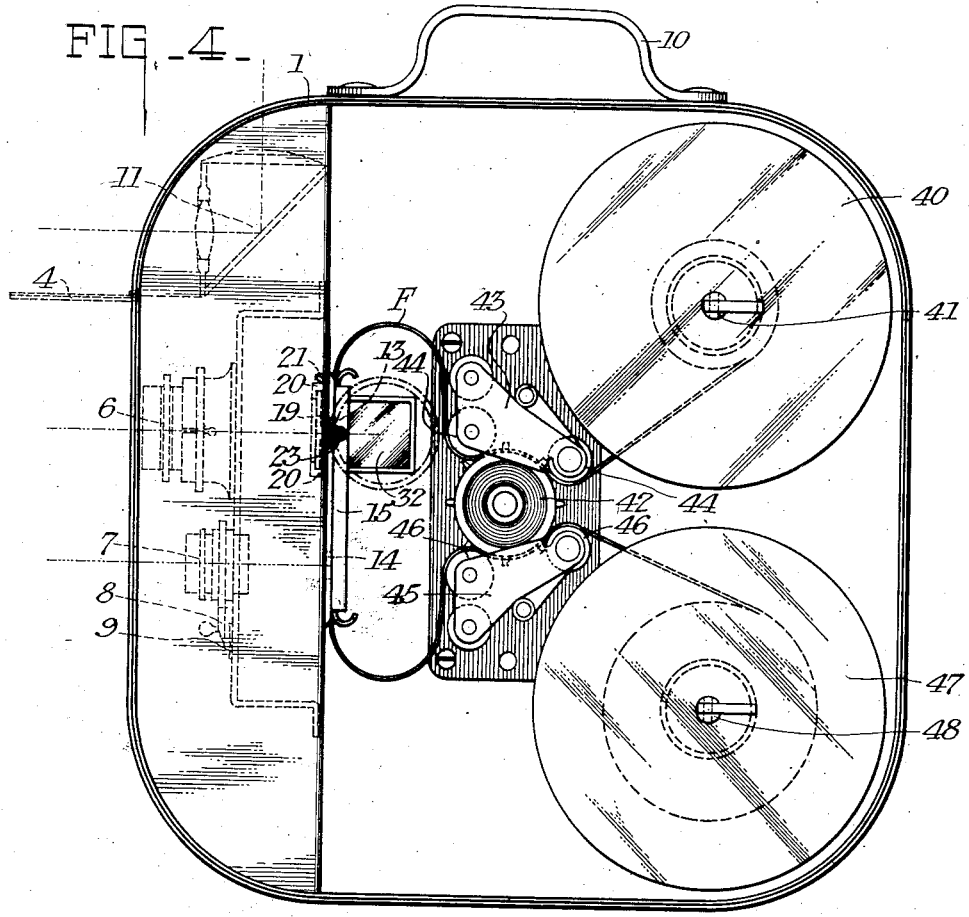
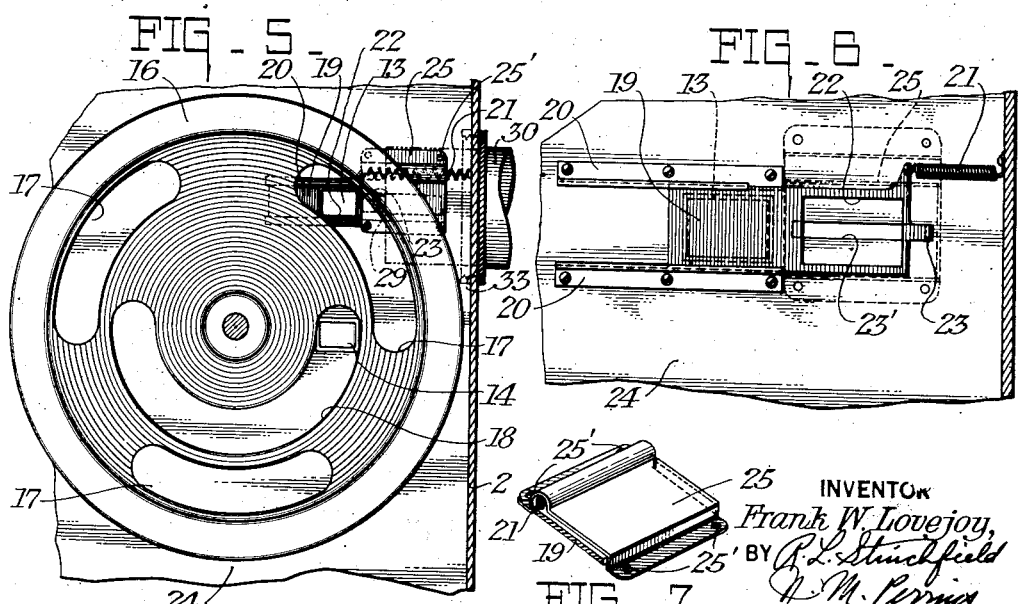
INVENTOR
Frank W. Lovejoy,
BY
ATTORNEY Patented May 5, 1925.

1,536,347

UNITED STATES PATENT OFFICE.

FRANK W. LOVEJOY, OF ROCHESTER, NEW YORK, ASSIGNOR TO EASTMAN KODAK COMPANY, OF ROCHESTER, NEW YORK, A CORPORATION OF NEW YORK.

APPARATUS FOR TAKING AND PROJECTING MOTION PICTURES.

Application filed December 26, 1922. Serial No. 609,094.

*To all whom it may concern:*

Be it known that I, FRANK W. LOVEJOY, a citizen of the United States of America, residing at Rochester, in the county of Monroe and State of New York, have invented certain new and useful Improvements in Apparatus for Taking and Projecting Motion Pictures, of which the following is a full, clear, and exact specification.

My present invention relates to motion picture apparatus and particularly to apparatus adapted both to take and to project motion pictures.

In the co-pending application of John G. Capstaff, Serial No. 609,045, filed Dec. 26, 1922 there is described and claimed such an apparatus equipped with two lenses, one for taking and one for projecting, and with corresponding taking and projecting windows but with a common guide or gate, common pull-down mechanism, common shutter, and other elements in common. In this apparatus a manually operated shutter is used before the projection gate excluding light therefrom when the apparatus is used as a camera.

The purpose of the present invention is to make such an apparatus which is rendered operative for projection automatically upon the positioning of the lamp house and which is rendered operative for taking, automatically when the lamp house is removed.

In the drawings, wherein like reference characters denote like parts throughout:

Fig. 1 is a perspective view of one embodiment of my machine ready for use as a taking camera;

Fig. 2 is a front elevation of the same machine, but equipped with a lamp house for projecting pictures;

Fig. 3 is a detail perspective of the lamp house door;

Fig. 4 shows the machine with the loading door removed;

Fig. 5 is a detail partly in section of certain parts of the machine;

Fig. 6 is an enlarged detail of the safety shutter, and

Fig. 7 is a detail perspective of a light guard used with the safety shutter.

The machine consists of a body portion 1 having a removable loading door 2 normally held closed by the sliding latches 3. A door 4 covers a lens board 5 which supports a projecting lens 6 and a taking lens 7, the latter being focused by lever 8 movable over a scale 9. There is a handle 10, finder 11, and a cranking handle 12 by which the film F is intermittently moved past the open frames, of which two are provided, 13 for projecting and 14 for taking. A gate 15 permits the film to be threaded into position in the usual manner.

Coming now to my invention, it will be noted that the shutter 16 contains two sets of slots, one set of three, 17, are for the projection of film, and the other single slot 18 for taking. As both lenses 6 and 7 are always open so that light may pass, it is necessary to shut off the rays passing through lens 6 when taking pictures. I provide for this purpose a sliding plate 19 movable in guide rails 20 and normally held in position to close frame 13 by spring 21. An opening 22 is provided in the end of this plate, and a lug 23 is bent therefrom so as to extend through slot 23' of the housing plate 24. In order to cover slot 23 a light baffle plate 25 bridges the shutter 19, and operating spring 21. Plate 25 is attached to housing plate 24 by screws or rivets 25'.

As can be seen in Figs. 1 and 3 the main door 2 is provided with an opening into which a cover 26 may be screwed by wings 27. The apparatus is used in this condition for taking pictures, and the shutter plate 19 is then in the position shown in Fig. 6.

When, however, door 26 is removed and the lamp house 28 is screwed into its place, the end 29 of the tubular casing 30 which encloses condensers strikes lug 23 and moves shutter plate 19 until openings 22 and 13 register.

In this position light rays from lamp 31 pass through the condensers, being reflected by mirror 32 through the film F; and lens 6 projects the image on the film to a screen.

The threaded portion 33 (Fig. 5) is made relatively short, so that lamp house 28 can be rapidly placed in position or removed.

When the lamp house is removed, spring 21 moves plate 19 to its closed position, thus effectually preventing light rays passing through lens 6 from reaching the film.

As is usual with this type of camera, the film F is drawn from a supply spool 40 carried by shaft 41 by means of a sprocket 42 upon which it is held by member 43 carrying rollers 44. After passing through gate 15 the film F passes over sprocket 42, again being held by member 45 similar to 43, and carrying presser rollers 46, from which it is wound upon the take-up reel 47 on shaft 48.

In operation my invention requires no attention from the operator, since gate 19 is closed as long as the lamp house door 26 is in place, but is automatically opened as soon as the lamp house 28 is positioned for projection.

Such an apparatus is obviously cheap to manufacture and simple to use. It is apparent that numerous embodiments of my invention are possible and I contemplate as within the scope of my invention all such equivalents and modifications as fall within the terms of the appended claims.

Having thus described my invention, what I claim as new and desire to secure by Letters Patent is:

1. In an apparatus for taking and projecting motion pictures, an exposure gate and a projection gate, a movable shutter having a position in front of said projection gate to exclude light therefrom, means whereby the projection gate may be illuminated, said illuminating means and said shutter having cooperative means whereby the shutter is moved from its normal position when the illuminating means is rendered operative.

2. In an apparatus for taking and projecting motion pictures, an exposure gate and a projection gate, a movable shutter normally positioned in front of said projection gate only to exclude light therefrom, means whereby the projection gate may be illuminated from the rear, said illuminating means and said shutter having cooperative means whereby the shutter is moved from its normal position when the illuminating means is rendered operative.

3. In an apparatus for taking and projecting motion pictures, an exposure gate and a projection gate, shutter means whereby said gates may be periodically covered and uncovered whereby they may be used respectively for the taking and projecting of motion pictures, means whereby the projection gate only may be illuminated, means adapted to render ineffective the projection gate and the shutter means corresponding thereto, and cooperative means between the last defined means and the illuminating means, whereby when the illuminating means is operative the projection gate and its corresponding shutter means will be rendered effective.

4. In an apparatus for taking and projecting motion pictures, an exposure gate and a projection gate, a common rotary shutter having different openings for periodically covering and uncovering said gates whereby they may be used respectively for the taking and projecting of motion pictures, means whereby the projection gate only may be illuminated, means adapted to render ineffective the projection gate and that portion of the shutter corresponding thereto, and cooperative means between the last defined means and the illuminating means, whereby when the illuminating means is operative the projection gate and the corresponding shutter portion will be rendered effective.

5. In an apparatus for taking and projecting motion pictures, an exposure gate and a projection gate, a shutter having a normal position in front of said projection gate but removable from such position, and a lamp house adapted to be attached to said apparatus in a position to illuminate said projection gate, the lamp house and shutter having cooperative means whereby the shutter is removed from its normal position when the lamp house is in position to illuminate said gate.

6. In an apparatus for taking and projection motion pictures, an exposure gate and a projection gate, a common shutter in front of said gates, objectives in front of said gates, a second shutter normally positioned in front of said projection gate but removable from such position, and a lamp house adapted to be attached to said apparatus in a position to illuminate said projection gate from the rear, the house and shutter having cooperating means whereby the shutter is removed from its normal position when the lamp house is in position to illuminate said gate.

7. An apparatus for taking and projecting motion pictures, comprising a light tight casing, an exposure gate and a projection gate within said casing, a movable shutter normally positioned to exclude light from said projection gate and thus permitting the use of the apparatus as a camera, and means whereby the projection gate may be illuminated, said last named means and said shutter having cooperative means whereby the shutter is moved from its normal position when the illuminating means is rendered operative, whereby the apparatus may be used to project images from said gate.

8. An apparatus for taking and projecting motion pictures, comprising a light tight casing, an exposure gate and a projection gate within said casing, suitable objectives in front of said gates, a movable shutter having a position in front of said projection gate and excluding light therefrom, there being in the casing an aperture in a position from which light may be directed to the projection gate, a removable light tight cover for said aperture, and a lamp house adapted to be positioned at said aperture when the cover is removed, the lamp house and shutter having cooperating means whereby the shutter is removed from its light excluding position when the lamp house is positioned at said aperture.

Signed at Rochester, New York, this 21st day of December 1922.

FRANK W. LOVEJOY.